United States Patent
Kiyosawa et al.

(10) Patent No.: US 8,920,535 B2
(45) Date of Patent: Dec. 30, 2014

(54) METHOD OF SEPARATING AND RECOVERING METAL ELEMENTS

(71) Applicants: Mitsubishi Heavy Industries, Ltd., Tokyo (JP); National University Corporation Akita University, Akita-shi, Akita (JP)

(72) Inventors: Masashi Kiyosawa, Tokyo (JP); Katsumi Nochi, Tokyo (JP); Norihisa Kobayashi, Kanagawa (JP); Kozo Iida, Hiroshima (JP); Katsuyasu Sugawara, Akita (JP); Yuuki Mochizuki, Hokkaido (JP)

(73) Assignees: Mitsubishi Heavy Industries, Ltd., Tokyo (JP); National University Corporation Akita University, Akita-shi, Akita (JP)

( * ) Notice: Subject to any disclaimer, the term of this patent is extended or adjusted under 35 U.S.C. 154(b) by 67 days.

(21) Appl. No.: 13/868,546

(22) Filed: Apr. 23, 2013

(65) Prior Publication Data
US 2013/0283975 A1  Oct. 31, 2013

(30) Foreign Application Priority Data
Apr. 27, 2012  (JP) .................. 2012-103786

(51) Int. Cl.
| | | |
|---|---|---|
| C22B 34/00 | (2006.01) | |
| C22B 34/22 | (2006.01) | |
| C22B 34/12 | (2006.01) | |
| C22B 34/36 | (2006.01) | |

(52) U.S. Cl.
CPC ............. *C22B 34/365* (2013.01); *C22B 34/225* (2013.01); *C22B 34/1222* (2013.01)
USPC ............... 75/401; 75/433; 75/615; 75/622; 75/623

(58) Field of Classification Search
CPC .. C22B 34/365; C22B 34/225; C22B 34/1222
USPC ............ 75/622, 433, 401, 615, 623
See application file for complete search history.

(56) References Cited

U.S. PATENT DOCUMENTS

2011/0239825 A1  10/2011  Nomura et al.

FOREIGN PATENT DOCUMENTS

| EP | 0 487 379 B1 | 10/1994 |
|---|---|---|
| JP | 2004-025019 A | 1/2004 |

(Continued)

OTHER PUBLICATIONS

Machine translation of WO 9503887 published Feb. 9, 1995.*

*Primary Examiner* — George Wyszomierski
*Assistant Examiner* — Tima M McGuthry Banks
(74) *Attorney, Agent, or Firm* — Westerman, Hattori, Daniels & Adrian, LLP (57) ABSTRACT

A separation and recovery method that enables titanium and tungsten to be separated and recovered from a used DeNOx catalyst in high yield. Specifically, a method of separating and recovering metal elements that includes a first heating step of heating a DeNOx catalyst containing titanium, tungsten, vanadium and iron in a chlorine atmosphere, thereby removing the vanadium and the iron from the DeNOx catalyst, and a second heating step, performed after the first heating step, of heating the DeNOx catalyst in a chlorine atmosphere while the catalyst is exposed to a gas of a hydrocarbon compound (excluding $CH_4$) or an oxygen-containing carbon compound, thereby volatilizing the tungsten and the titanium from the DeNOx catalyst, and recovering the tungsten and the titanium from the DeNOx catalyst.

7 Claims, 5 Drawing Sheets (56) References Cited

FOREIGN PATENT DOCUMENTS

| JP | 2007-268332 A | 10/2007 |
| JP | 2007-268339 A | 10/2007 |
| JP | 2008-049204 A | 3/2008 |
| JP | 2008-222499 A | 9/2008 |
| JP | 2009-132960 A | 6/2009 |
| JP | 2011-074408 A | 4/2011 |

* cited by examiner

METHOD OF SEPARATING AND RECOVERING METAL ELEMENTS

CROSS-REFERENCE TO RELATED APPLICATIONS

This application is based on Japanese Patent Application No. 2012-103786, the contents of which are incorporated herein by reference.

BACKGROUND OF THE INVENTION

1. Field of the Invention

The present invention relates to a method of separating and recovering the useful elements of tungsten and titanium from a used DeNOx catalyst.

2. Description of Related Art

When a coal-fired boiler, a heavy oil-fired boiler, or a combustion furnace fitted to any of various chemical apparatus is operated, an exhaust gas containing nitrogen oxides (hereafter abbreviated as NOx) is discharged. Because NOx is an atmospheric pollutant that generates photochemical smog and acid rain, the NOx must be removed from the exhaust gas prior to discharge of the exhaust gas from the plant. One method that is used for removing NOx from the exhaust gas is the selective catalytic reduction method. The selective catalytic reduction method is a method that uses a reduction catalyst to react the NOx with ammonia, thereby decomposing and detoxifying the NOx. The selective catalytic reduction method is recognized as the most economic and effective method, and is widely used industrially.

Figure 6:
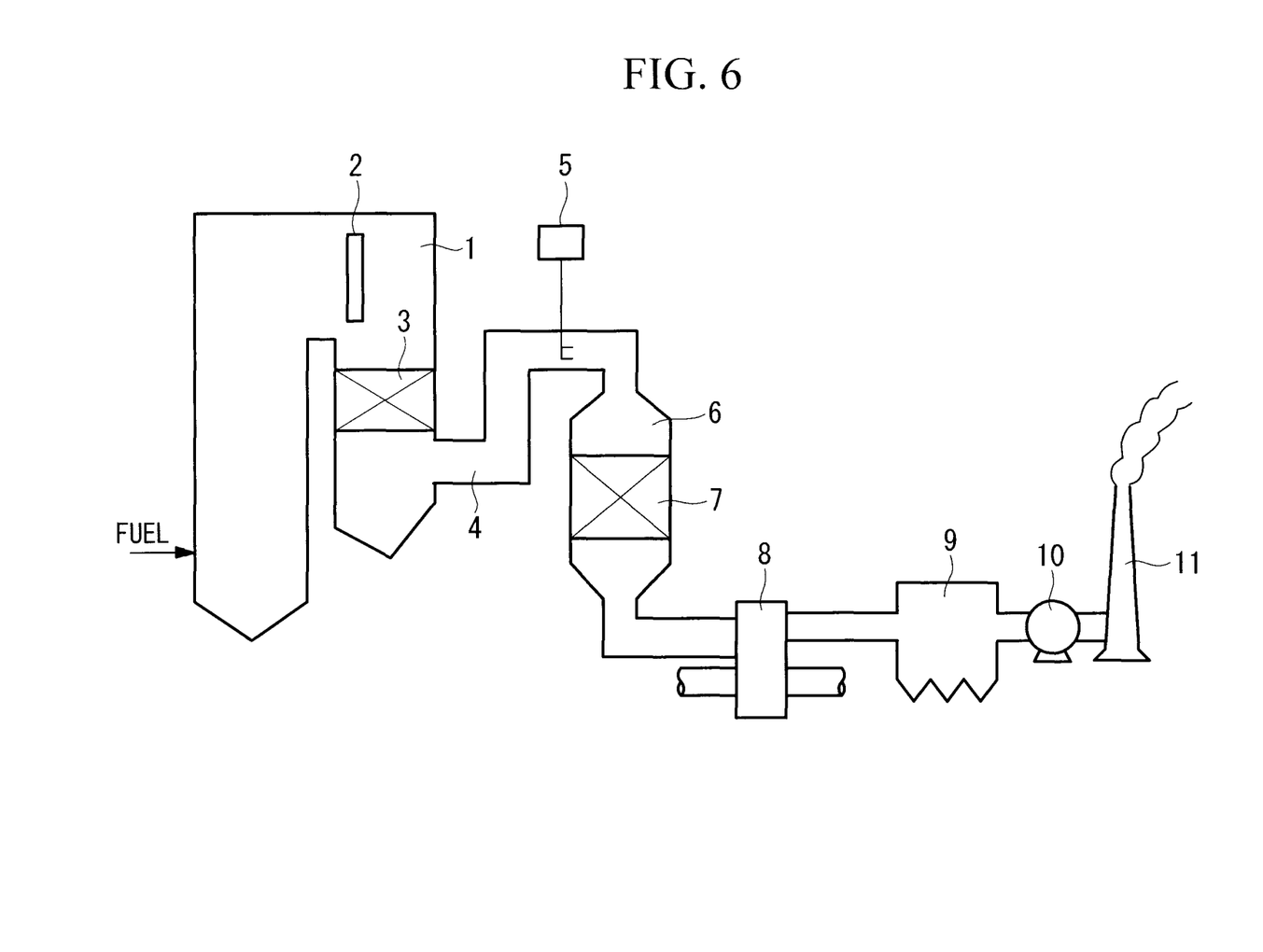
FIG. 6 illustrates an example of a DeNOx apparatus.

FIG. 6 shows an example of the structure of a DeNOx apparatus that uses the selective catalytic reduction method. In FIG. 6, a combustion exhaust gas generated in a boiler 1 passes through a super heater 2 and an economizer 3, before reaching a flue 4 that guides the exhaust gas into a DeNOx reactor 6. An ammonia injector 5 is provided in the flue 4, and the ammonia gas that is required for the DeNOx reaction is injected into the flue 4 from the ammonia injector 5. The NOx within the combustion exhaust gas is decomposed into nitrogen and water during passage through a catalyst layer 7 disposed inside the DeNOx reactor 6. Subsequently, the combustion exhaust gas passes through an air heater 8, an electrical dust precipitator 9 and a combustion exhaust gas fan 10, before being discharged into the atmosphere from a chimney 11.

The catalyst layer 7 disposed inside the DeNOx reactor 6 is composed mainly of a gas parallel flow-type catalyst having a lattice-like or plate-like form. In a gas parallel flow-type catalyst, the combustion exhaust gas flows in parallel along the surface of the DeNOx catalyst. As a result, the dust and soot within the combustion exhaust gas has little chance to contact the surface of the DeNOx catalyst, thus offering the advantage that adhesion of the dust and soot to the catalyst surface is minimal. Accordingly, gas parallel flow-type catalysts are widely employed in DeNOx apparatus for coal-fired boilers and heavy oil-fired boilers and the like.

The DeNOx catalyst used in these types of DeNOx apparatus employs titanium oxide ($TiO_2$) as the base material. Active components such as vanadium pentoxide ($V_2O_5$), tungsten oxide ($WO_3$) and molybdenum oxide ($MoO_3$) are supported on the base material.

The above DeNOx catalyst exhibits superior DeNOx performance over a wide temperature range. However, even though this superior performance is maintained during an initial period, the DeNOx performance gradually deteriorates when the catalyst is used for a long period. Examples of the causes of this deterioration in the DeNOx performance include (1) adhesion of dust and soot to the surface of the DeNOx catalyst, blocking holes through which the gas passes, (2) diffusion into the DeNOx catalyst of a poison component contained within dust and soot adhered to the surface of the catalyst, resulting in poisoning of the DeNOx catalyst, and (3) gasification of a substance contained within the fuel inside the furnace that results in the formation of a catalyst poison, which subsequently undergoes physical adsorption to the DeNOx catalyst or chemical reaction with a component of the catalyst, thus impairing the progress of the DeNOx reaction.

The deterioration in performance caused by adhesion of dust and soot to the surface of the DeNOx catalyst, as described above in (1) and (2), can be suppressed by providing a dust removal device at the combustion gas inlet side of the catalyst layer 7, thus reducing the amount of dust and soot reaching the catalyst layer 7.

However, in the case of poisoning of the DeNOx catalyst by a gaseous component, as described above in (3), there are currently no countermeasures available for preventing the poison component from penetrating into the catalyst layer 7. As a result, the durability of the DeNOx catalyst varies considerably depending on the types and amounts of poisonous substances contained within the fuel.

In a coal-fired boiler, coal is used as the fuel, but the quality of coal varies considerably depending on the area in which it was produced, and some coal contains a large amount of arsenic. This arsenic causes deterioration of the catalyst, and once the DeNOx catalyst has deteriorated, it is replaced. Currently, this used DeNOx catalyst is discarded, with no attempt made to recover the rare metals such as tungsten and titanium from the catalyst.

Examples of methods used for separating and recovering rare metals from ore and the like include the chlorination volatilization method disclosed in PTL 1 and PTL 2. The chlorination volatilization method is a method in which the separation target material (such as the ore) is heated in a chlorine atmosphere to convert the various components to chlorides, and the difference in boiling points of these chloride compounds is then used to volatilize and separate the compounds.

PTL 3 and PTL 4 disclose the addition of a chloride of an alkaline earth metal such as calcium chloride as a chlorine source to the raw material containing the heavy metal elements in the chlorination volatilization method. PTL 5 discloses a chlorination volatilization method in which a calcium compound is added to the raw material, a heat treatment is performed under an inert atmosphere, W, Nb, Ni and Co are then volatilized under a gas stream of chlorine to produce solid compounds having a high concentration of Ta, Cr and Ti, and these high-concentration solid compounds are subsequently mixed with solid carbon and heated in a chlorine atmosphere to volatilize Ta, Cr and Ti. In PTL 3 to PTL 5, Ca or the like is added to change the state of the compounds, thereby increasing the reactivity with chlorine.

PTL 1: Japanese Unexamined Patent Application, Publication No. 2009-132960 (claim 1, and paragraphs [0017] to [0019])
PTL 2: Japanese Unexamined Patent Application, Publication No. 2011-74408 (claim 1, and paragraphs [0028] to [0034])
PTL 3: Japanese Unexamined Patent Application, Publication No. 2007-268339 (paragraphs [0052] to [0057])
PTL 4: Japanese Unexamined Patent Application, Publication No. 2008-49204 (claims 1 and 7, and paragraphs [0043] to [0048])

PTL 5: Japanese Unexamined Patent Application, Publication No. 2008-222499 (claim 1, and paragraphs [0010] to [0011])

BRIEF SUMMARY OF THE INVENTION

As disclosed in PTL 3 to PTL 5, it is well recognized by those skilled in the art that in the chlorination volatilization method, the addition of Ca is advantageous in enhancing the reactivity between the metal elements and chlorine. However, the added Ca must be separated as an impurity prior to recovery of each of the metal elements. As a result, the recovery process becomes more complex, and there is a possibility that the purity of the recovered metals may deteriorate.

Further, in PTL 5, although solid carbon is mixed with the raw material, because the carbon is a solid, the contact surface area between the carbon and the raw material is relatively small, meaning the efficiency is poor.

An object of the present invention is to provide a separation and recovery method that enables titanium and tungsten to be separated and recovered from a used DeNOx catalyst in high yield.

In order to achieve the above object, the present invention provides a method of separating and recovering metal elements that includes a first heating step of heating a DeNOx catalyst containing titanium, tungsten, vanadium and iron in a chlorine atmosphere, thereby removing the vanadium and the iron from the DeNOx catalyst, and a second heating step, performed after the first heating step, of heating the DeNOx catalyst in a chlorine atmosphere while the catalyst is exposed to a gas of a hydrocarbon compound (excluding $CH_4$) or an oxygen-containing carbon compound, thereby volatilizing the tungsten and the titanium from the DeNOx catalyst, and recovering the tungsten and the titanium from the DeNOx catalyst.

The present invention provides a method of separating and recovering specific desired metal elements (titanium and tungsten) from a used DeNOx catalyst using the chlorination volatilization method. First, the metal oxides in the DeNOx catalyst are converted to chloride compounds, and the difference in volatility of the chloride compounds is used to remove vanadium and iron. Subsequently, a carbon compound is added to the DeNOx catalyst, and heating is conducted within a chlorine atmosphere to recover tungsten and titanium. By employing this method, tungsten and titanium can be separated and recovered from the DeNOx catalyst in high yield. The chlorine atmosphere described in the present invention includes not only a chlorine gas atmosphere, but also gaseous atmospheres containing chlorine compounds such as HCl, NaCl, KCl, and $CaCl_2$.

In the present invention, a hydrocarbon compound (excluding $CH_4$) or an oxygen-containing carbon compound is used as the carbon compound. These compounds exist in a gaseous state at the heating temperature used for chlorinating the metal elements. Because the DeNOx catalyst and the carbon compound gas contact each other efficiently, the reaction efficiency can be improved.

In the invention described above, the first heating step is performed at a first heating temperature, the second heating step is performed at a second heating temperature, and the second heating temperature is lower than the first heating temperature.

Because the volatilization temperature of the metal chlorides is lower in the presence of the carbon compound gas than in the absence of the carbon compound gas, use of the carbon compound gas is advantageous.

In the invention described above, mainly tungsten may be volatilized and recovered from the DeNOx catalyst in the second heating step.

The temperature dependency of the volatility differs for tungsten chloride and titanium chloride. When heating is performed in the presence of the carbon compound gas described above, the temperature can be set to a temperature at which titanium chloride volatilizes poorly but tungsten chloride volatilizes readily. By utilizing this difference in volatility, mainly tungsten can be separated and removed from the DeNOx catalyst in the second heating step.

The invention described above preferably also includes a recovery step of cooling the gas containing the volatilized tungsten and titanium in a stepwise manner, thereby separating and recovering the tungsten and the titanium.

By utilizing the difference in the crystallization temperatures of tungsten chloride and titanium chloride, and cooling the volatilized gas in a stepwise manner, tungsten and titanium can be separated and recovered from the DeNOx catalyst.

By employing the present invention, tungsten and titanium can be recovered from a used DeNOx catalyst using the chlorination volatilization method. Further, if the aforementioned carbon compound gas is circulated through the system during the volatilization of the tungsten chloride and the titanium chloride, then the carbon compound gas and the DeNOx catalyst contact each other efficiently, enabling the recovery rate to be improved.

DETAILED DESCRIPTION OF THE INVENTION

The target material for the metal element separation and recovery performed in an embodiment of the present invention is a used DeNOx catalyst that has been used for a long period in a coal-fired boiler.

The DeNOx catalyst contains oxide components including titanium oxide ($TiO_2$), which represents the base material, as well as tungsten oxide ($WO_3$) and vanadium oxide ($V_2O_5$). The DeNOx catalyst may also contain molybdenum oxide ($MoO_3$). The DeNOx catalyst also contains other oxide components such as iron oxide ($Fe_2O_3$), silicon oxide ($SiO_2$) and calcium oxide (CaO). Further, the DeNOx catalyst may also be contaminated with arsenic from the coal that is used as the fuel, and therefore the used DeNOx catalyst may also contain arsenic oxide ($As_2O_3$). An example of the composition of the DeNOx catalyst is shown in Table 1.

TABLE 1

| Composition | Fraction (wt %) |
|---|---|
| $TiO_2$ | 60-80 |
| $WO_3$ | 6-9 |
| $V_2O_5$ | 0.3-2 |
| $Fe_2O_3$ | 0.01-0.5 |
| $SiO_2$ | 5-18 |
| $As_2O_3$ | 0.05-4 |
| $Al_2O_3$ | 0.5-3 |
| CaO | 1.3-2.5 |
| Other | 1-15 |

Prior to performing the separation and recovery of the various metal elements, the used DeNOx catalyst is crushed using a coarse crusher or the like to generate coarse pieces and a fine powder. The fine powder includes ash, which is generated during combustion of the coal and adheres to the surface of the DeNOx catalyst. On the other hand, the coarse pieces contain no ash.

Following crushing, the coarse pieces and fine powder are separated using a sieve. The collected coarse pieces are subjected to separation and recovery of the metal elements. At this time, if the classification is performed so as to separate coarse particles having an average particle size of not less than 200 μm from a powder having an average particle size of less than 200 μm, then ash contamination can be prevented.

The collected coarse pieces are crushed to a fine powder having an average particle size of not more than 100 μm using a fine crusher such as a hammer mill.

Figure 1:
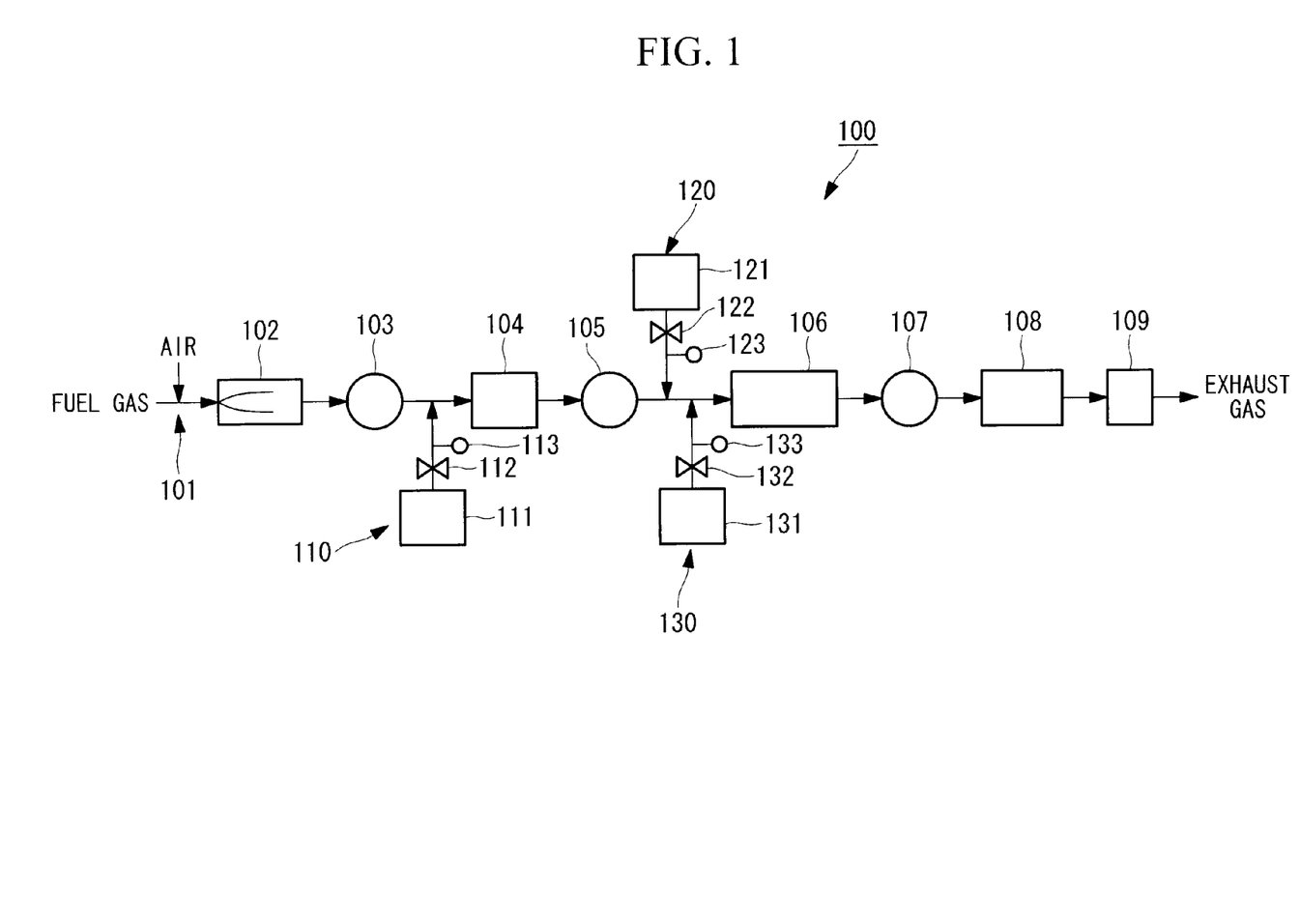
FIG. 1 is a schematic illustration of a separation and recovery apparatus used in the method of separating and recovering metal elements according to the present invention.

FIG. 1 is a schematic illustration of a separation and recovery apparatus used in the method of separating and recovering metal elements from the used DeNOx catalyst according to the present embodiment. In the separation and recovery apparatus 100, a fuel gas supply unit 101 is connected to a burner 102. The fuel gas supply unit 101 supplies natural gas or a gas from a town gas supply as a fuel gas, together with air, to the burner 102. The burner 102 combusts the fuel gas in the air.

The carbon dioxide and water vapor generated within the burner 102, together with the nitrogen gas within the air, are supplied as a combustion gas to an oxygen removal catalyst 104.

A fuel supply unit 110 comprises a fuel tank 111, a valve 112 and a flow rate meter 113. When the valve 112 is opened, the fuel supply unit 110 supplies a fuel that enables the oxygen removal catalyst to remove the oxygen within the combustion gas exiting a heat exchanger 103. The fuel used is $C_3H_6$ or the like. The flow rate meter 113 is used to regulate the flow rate of the supplied fuel. The fuel is supplied to the oxygen removal catalyst 104 together with the combustion gas.

The oxygen removal catalyst 104 is connected to a separation furnace 106 with a heat exchanger 105 disposed therebetween. The oxygen removal catalyst 104 removes residual oxygen contained within the combustion gas. A catalyst containing platinum or palladium supported on alumina or titania can be used as the oxygen removal catalyst 104.

A chlorine-based gas supply unit 120 comprises a chlorine-based gas tank 121, a valve 122 and a flow rate meter 123. In the present embodiment, the chlorine-based gas is chlorine gas ($Cl_2$) or chlorine compound gas, wherein examples of the chlorine compound gas include HCl and the like. The chlorine-based gas is supplied from the chlorine-based gas supply unit 120 to the combustion gas and the fuel. The flow rate meter 123 is used to regulate the flow rate of the supplied chlorine-based gas.

A carbon compound supply unit 130 comprises a carbon compound storage tank 131, a valve 132 and a flow rate meter 133. A carbon compound in a gaseous state is supplied from the carbon compound supply unit 130 to the combustion gas and the fuel. The flow rate meter 133 is used to regulate the flow rate of the supplied carbon compound.

In the present embodiment, the carbon compound supplied from the carbon compound supply unit 130 is a hydrocarbon compound (excluding $CH_4$) or an oxygen-containing carbon compound. The oxygen-containing carbon compound is an alcohol. The hydrocarbon compound (excluding $CH_4$) or the oxygen-containing carbon compound exists in a gaseous state at temperatures equal to or higher than the separation and recovery treatment temperature, specifically at temperatures of 300° C. or higher. Examples of the hydrocarbon compound include ethane ($C_2H_6$), propane ($C_3H_8$), cyclopropane ($C_3H_6$), propene ($C_3H_6$), butane ($C_4H_{10}$), cyclobutane ($C_4H_8$) and butene ($C_4H_8$). Examples of the oxygen-containing compound (alcohol) include methanol ($CH_4O$), ethanol ($C_2H_6O$), propanol ($C_3H_8O$) and butanol ($C_4H_{10}O$).

The combustion gas, the fuel, the carbon compound and the chlorine-based gas are fed into the separation furnace 106. The crushed DeNOx catalyst is housed inside the separation furnace 106. The temperature inside the separation furnace 106 is controlled at a predetermined temperature using the combustion gas. Inside the separation furnace 106, the various metal oxides within the DeNOx catalyst react with the chlorine-based gas to produce metal chlorides. Each of the metal chlorides volatilizes at a specific temperature.

The gas containing the volatilized metal chlorides is discharged from the separation furnace 106 and fed into a recovery unit 108. The recovery unit 108 separates and recovers the desired metal components from the gas containing the metal chlorides that flows into the recovery unit 108 from the separation furnace 106. The recovery unit 108 comprises a tungsten recovery unit and a titanium recovery unit.

An afterburner 109 combusts the unreacted carbon compound and the carbon monoxide generated during the separation and recovery process in the separation furnace 106, and discharges the combustion products outside the separation and recovery apparatus 100.

One embodiment of a method of separating and recovering metal elements according to the present invention is described below with reference to FIG. 1.

A DeNOx catalyst from which the ash has been removed and which has been processed into a fine powder in the manner described above is placed inside the separation furnace 106.

<First Heating Step>

The DeNOx catalyst inside the separation furnace 106 is heated by feeding the combustion gas generated in the burner 102 into the separation furnace 106. The supply rates for the combustion gas and the air are controlled so that the DeNOx catalyst reaches a first heating temperature.

The valve 122 of the chlorine-based gas supply unit 120 is opened, and a predetermined amount of the chlorine-based gas is supplied from the chlorine-based gas tank 121 to the heated nitrogen gas. The chlorine-based gas is fed into the separation furnace 106. As a result, the inside of the separation furnace 106 becomes a chlorine atmosphere. At this time, the valve 132 of the carbon compound supply unit 130 is closed.

At the first heating temperature, each of the metal oxides within the DeNOx catalyst reacts with the chlorine-based gas, producing a metal chloride. The volatilization temperatures of the metal chlorides vary depending on the element. In the first heating step, mainly vanadium and iron are removed from the DeNOx catalyst.

Figure 2:
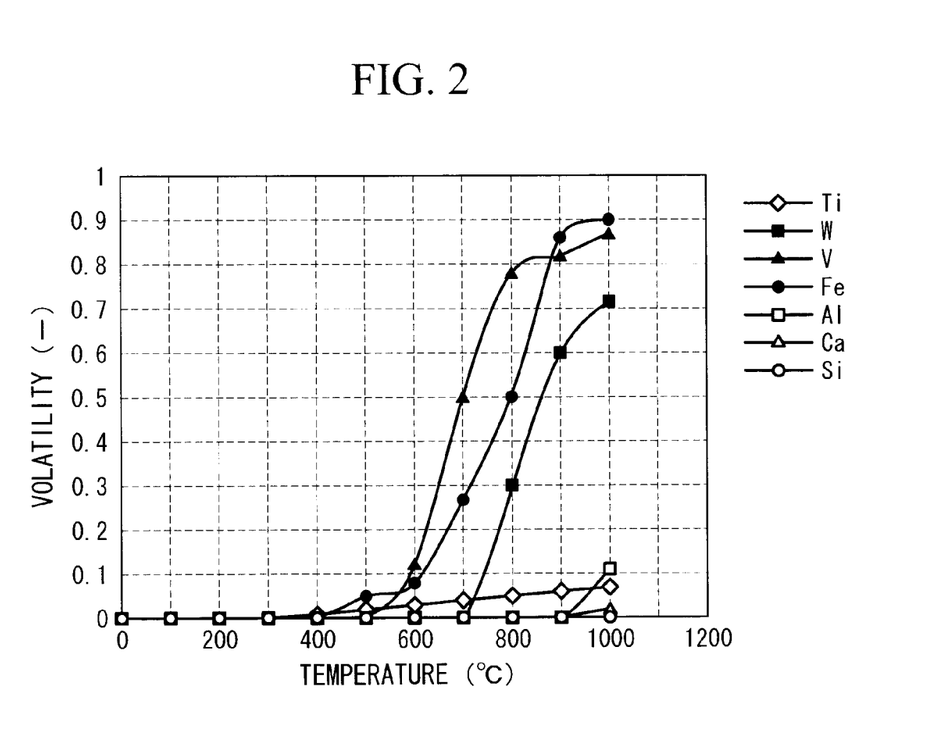
FIG. 2 is a graph illustrating the volatility of various metal elements when a DeNOx catalyst is heated in a chlorine atmosphere.

FIG. 2 is one example of a graph illustrating the volatility of the various metal elements when the DeNOx catalyst is heated in a chlorine atmosphere. In this figure, the horizontal axis represents the temperature and the vertical axis represents the volatility. The graph of FIG. 2 was acquired using a DeNOx catalyst having the composition shown in Table 2. The composition of the DeNOx catalyst of Table 2 was measured using an ICP (optical emission spectrometer).

TABLE 2

| Composition | Fraction (wt %) |
|---|---|
| $TiO_2$ | 60 |
| $WO_3$ | 8 |
| $V_2O_5$ | 0.6 |
| $Fe_2O_3$ | 0.4 |
| $Al_2O_3$ | 3 |
| $SiO_2$ | 12 |
| CaO | 2.5 |
| Other | 13.5 |

Figure 3:
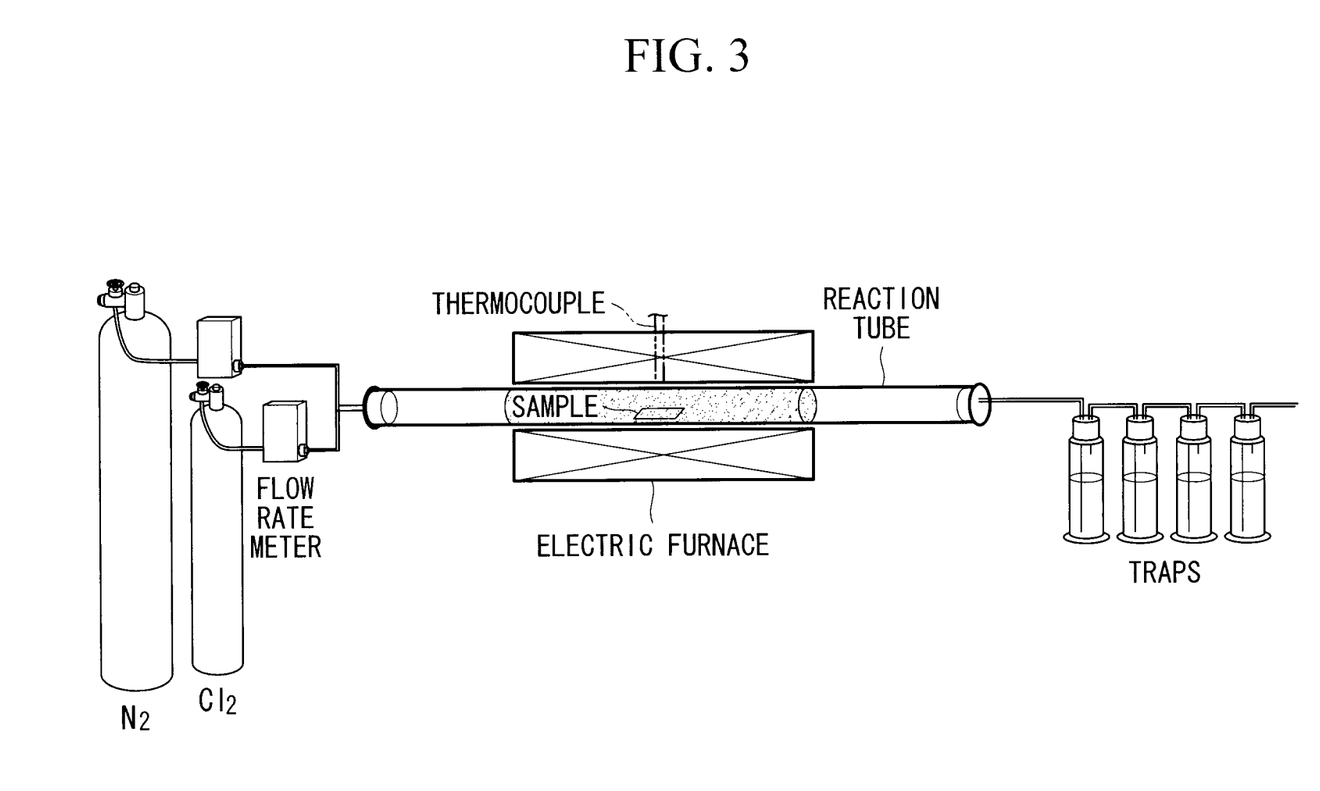
FIG. 3 is a schematic illustration of the test apparatus used to acquire the results shown in FIG. 2.

A test apparatus illustrated in FIG. 3 was used to acquire the graph shown in FIG. 2. The DeNOx catalyst powder was placed in a silica reaction tube, and the reaction tube was heated in an electric furnace. The test conditions were as follows.

Chlorine gas flow rate: 100 ml/min (NTP)

Measurement temperature: heated from 100° C. to 1,000° C.

Rate of temperature increase: 30° C./min

The gas discharged from the reaction tube is collected in a trap. In the test apparatus illustrated in FIG. 3, an aqueous solution of sodium hydroxide is provided as an absorbent in a plurality of traps. A thermocouple inserted inside the reaction tube is used to measure the temperature inside the reaction tube. The test was performed by placing a fresh powder sample inside the tube for each test, and performing tests across nine different temperature ranges, namely from 100° C. to 200° C., 100° C. to 300° C., 100° C. to 400° C., 100° C. to 500° C., 100° C. to 600° C., 100° C. to 700° C., 100° C. to 800° C., 100° C. to 900° C., and 100° C. to 1,000° C. The volatilization amounts were determined by measuring the weight before and after treatment, measuring the amount of each element within the powder after testing using an ICP (optical emission spectrometer), and calculating the change from the concentration prior to treatment.

Reference to FIG. 2 reveals that V (vanadium chloride) starts to volatilize when the temperature exceeds 500° C., with the volatilization volume increasing rapidly with increasing temperature. Fe (iron chloride) starts to volatilize when the temperature exceeds 400° C., with the volatilization volume increasing rapidly once the temperature exceeds 500° C. In contrast, W (tungsten chloride) starts to volatilize when the temperature exceeds 700° C. Ti (titanium chloride) starts to volatilize when the temperature exceeds 400° C., but the volatilization volume remains significantly lower than that of V, Fe and W, even when the temperature is increased. Al, Ca and Si were not detected at temperatures of 900° C. or lower.

Based on FIG. 2 it is evident that if the first heating temperature is set within the temperature range in which the volatilization volumes of vanadium chloride and iron chloride are high but the volatilization volumes of tungsten chloride and titanium chloride are low, then the vanadium and iron within the DeNOx catalyst can be separated from the tungsten and titanium. Specifically, the first heating temperature is set to a temperature within a range from 600 to 700° C. In the example shown in FIG. 2, the DeNOx catalyst is heated to a temperature of not less than 600° C. as the first heating temperature.

FIG. 2 represents the results obtained when the temperature was increased continuously, but in the separation and recovery method of the present embodiment, the DeNOx catalyst is held at the first heating temperature for a predetermined period. By holding the heating temperature at the first heating temperature, all of the vanadium and iron within the DeNOx catalyst is removed.

In the first heating step, some volatilization of tungsten chloride and titanium chloride together with the vanadium chloride and iron chloride is permitted, although due consideration must be given to the recovery rate.

As illustrated in FIG. 2, at those temperatures where the volatilization volumes of vanadium chloride and iron chloride are large, titanium chloride also undergoes volatilization, albeit at a low volatilization volume. However, as illustrated in Table 1 and Table 2, the amounts of vanadium oxide and iron oxide in the DeNOx catalyst are much smaller than the amount of titanium oxide. Accordingly, even when the first heating temperature is held for a period sufficiently long to volatilize all of the vanadium chloride and iron chloride, the volatilization volume of titanium chloride during that period is much smaller than the amounts of titanium chloride and tungsten chloride that do not volatilize and are retained within the catalyst. Accordingly, even if some volatilization of titanium chloride is permitted during the first heating step, titanium chloride can still be recovered in high yield.

Further, as illustrated in FIG. 2, tungsten chloride volatilizes at a higher temperature than vanadium chloride and iron chloride. If the desired tungsten recovery rate is 100%, then the first heating temperature must be set to a temperature of 700° C. or lower.

<Second Heating Step>

Following completion of the first heating step, the valve 132 of the carbon compound supply unit 130 is opened. This supplies the aforementioned carbon compound gas from the carbon compound storage tank 131 to the separation furnace 106. In other words, in the second heating step, the inside of the separation furnace 106 becomes a mixed atmosphere containing the chlorine-based gas and the carbon compound gas. Inside the separation furnace 106, the carbon compound gas circulates through the powder-state DeNOx catalyst. Accordingly, the surface area of the DeNOx catalyst exposed to the carbon compound gas is large, enabling the DeNOx catalyst to be exposed efficiently to the carbon compound gas.

In the second heating step, the DeNOx catalyst inside the separation furnace 106 is heated to a second heating temperature by the heated gas. In the second heating step, tungsten and titanium are separated from the DeNOx catalyst.

Figure 4:
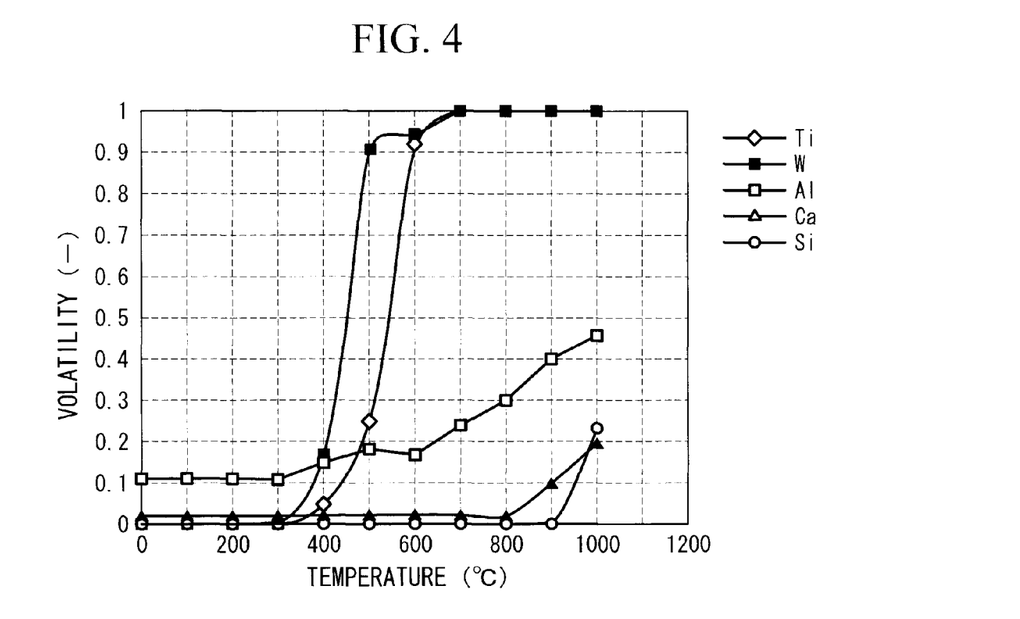
FIG. 4 is a graph illustrating the volatility of various elements when a DeNOx catalyst is heated in a chlorine atmosphere while $C_3H_6$ gas is circulated through the catalyst.

FIG. 4 is one example of a graph illustrating the volatility of various elements when a DeNOx catalyst is heated in a chlorine atmosphere while $C_3H_6$ gas is circulated through the catalyst. In this figure, the horizontal axis represents the temperature and the vertical axis represents the volatility. The graph of FIG. 4 was acquired by heating the DeNOx catalyst having the composition shown in Table 2 from 0 to 1,000° C. at a rate of 30° C./min. Therefore, V and Fe had been removed from the DeNOx catalyst used in acquiring FIG. 4.

The test apparatus illustrated in FIG. 3, further fitted with a $C_3H_6$ gas bottle and a flow rate meter, was used to acquire the graph shown in FIG. 4. The test conditions were as follows.

Chlorine gas flow rate: 100 ml/min (NTP)
$C_3H_6$ flow rate: 100 ml/min
Rate of temperature increase: 30° C./min The method used for measuring the amount of each element within the volatilized components, and the calculation of the volatilization volumes were the same as described for FIG. 2.

Reference to FIG. 4 reveals that when the heating temperature exceeds 300° C., W (tungsten chloride) and Ti (titanium chloride) both volatilize, but at any particular temperature, the volatilization volume of W is larger than that of Ti.

Based on FIG. 4 it is evident that if the second heating temperature is set within the temperature range in which tungsten chloride and titanium chloride undergo volatilization, then tungsten and titanium can be separated from the DeNOx catalyst. In the example shown in FIG. 4, if the DeNOx catalyst is heated at a temperature higher than 300° C. as the second heating temperature, and this temperature is held for a predetermined period, then tungsten and titanium can be separated from the DeNOx catalyst. In order to achieve a more efficient separation, the second heating temperature is preferably set to a temperature at which the volatilities of tungsten chloride and titanium chloride undergo rapid increase. In the example shown in FIG. 4, the temperature is preferably 400° C. or higher.

As illustrated in FIG. 4, by exposing the DeNOx catalyst to the carbon compound gas described above, the volatilization temperature of tungsten chloride can be lowered. Accordingly, the second heating temperature can be set to a lower temperature than the first heating temperature.

Further, as illustrated in FIG. 4, if the second heating temperature is set within the temperature range in which the volatilization volume of tungsten chloride is greater than the volatilization volume of titanium chloride, then the tungsten and the titanium within the DeNOx catalyst can be separated. Specifically, the second heating temperature is set to a temperature at which the volatilization volume of tungsten chloride is significantly higher than the volatilization volume of titanium chloride. In the example shown in FIG. 4, the DeNOx catalyst is heated at a second heating temperature of at least 400° C. but not more than 500° C. If this heating temperature is held for a period of time shorter than the time required to volatilize both the tungsten and the titanium, then mainly tungsten can be separated from the DeNOx catalyst.

Figure 5:
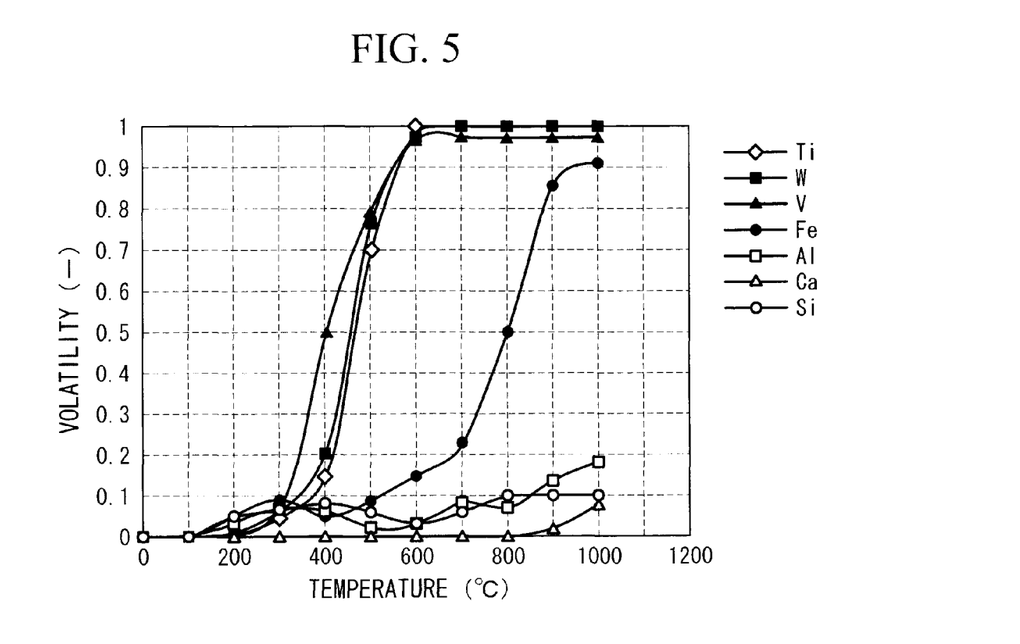
FIG. 5 is a graph illustrating the volatility of various elements when a DeNOx catalyst is heated using a method of a comparative example.

As a comparative example, FIG. 5 illustrates one example of a graph representing the volatility of various elements when a DeNOx catalyst having the composition shown in Table 2 is heated in a chlorine atmosphere while $C_3H_6$ gas is circulated through the catalyst. In other words, this comparative example differs from the embodiment of the present invention in that the $C_3H_6$ gas is circulated through the catalyst from the start of the process. In FIG. 5, the horizontal axis represents the temperature and the vertical axis represents the volatility. FIG. 5 was prepared using the same test apparatus as that used for acquiring FIG. 3. The test conditions were as follows.

Chlorine gas flow rate: 100 ml/min (NTP)
$C_3H_6$ flow rate: 100 ml/min
Measurement temperature: heated from 100° C. to 1,000° C.
Rate of temperature increase: 30° C./min As illustrated in FIG. 5, when $C_3H_6$ is circulated through the catalyst from the start of the process, the volatilization volume of iron (iron chloride) is reduced. Further, in the temperature range from 200° C. to 600° C., the volatilization behavior of V (vanadium chloride) is similar to the volatilization behavior of W (tungsten chloride) and Ti (titanium chloride).

Accordingly, in the comparative example, the V and Fe, and the W and Ti cannot be separated and recovered from the DeNOx catalyst.

<Recovery Step>

The components that are volatilized in the second heating step are fed from the separation furnace 106 into the recovery unit 108.

The boiling point of titanium chloride and the boiling point of tungsten chloride differ. For example, the boiling point of $TiCl_4$ is 136° C., whereas the boiling point of $WCl_5$ is 275° C. and the boiling point of $WCl_6$ is 346° C. Consequently, by cooling the gas containing the volatilized titanium and tungsten, the tungsten can be condensed first, followed by condensation of the titanium as the temperature is cooled further.

The temperature of the tungsten component recovery unit in the recovery unit 108 is held at a third temperature. The third temperature is a temperature at which the tungsten component exists as a liquid or solid, but the titanium component exists as a gas. Specifically, the fourth temperature is set to a temperature within a range from 200° C. to 300° C. The gas containing the volatilized components supplied to the recovery unit 108 from the separation furnace 106 is fed into the tungsten component recovery unit. The tungsten component condenses on the surfaces of the walls of the tungsten component recovery unit. As a result, a solid-state tungsten component can be separated and recovered from the gas containing the volatilized components. The gas containing the remaining volatilized components is discharged from the tungsten component recovery unit and fed into the titanium component recovery unit.

The temperature of the titanium component recovery unit in the recovery unit 108 is held at a fourth temperature. The fourth temperature is a temperature at which the titanium component exists as a liquid. Specifically, the fourth temperature is set to a temperature of 136° C. or lower. The gas containing the volatilized components fed into the titanium component recovery unit condenses on the surfaces of the walls of the titanium component recovery unit. As a result, a liquid-state titanium component can be recovered.

1 Boiler
2 Super heater
3 Economizer
4 Flue
5 Ammonia injector
6 DeNOx reactor
7 Catalyst layer
8 Air heater
9 Electrical dust precipitator
10 Combustion exhaust gas fan
11 Chimney
100 Separation and recovery apparatus
101 Fuel gas supply unit
102 Burner
103, 105, 107 Heat exchanger
104 Oxygen removal catalyst
106 Separation furnace
108 Recovery unit
109 Afterburner
110 Fuel supply unit
111 Fuel tank
112, 122, 132 Valve
113, 123, 133 Flow rate meter
120 Chlorine-based gas supply unit 121 Chlorine-based gas tank
130 Carbon compound supply unit
131 Carbon compound storage tank

What is claimed is:

1. A method of separating and recovering metal elements, the method comprising:
    a first heating step of heating a denitration (DeNOx) catalyst containing titanium, tungsten, vanadium and iron in a chlorine atmosphere, thereby removing the vanadium and the iron from the DeNOx catalyst, and
    a second heating step, performed after the first heating step, of heating the DeNOx catalyst in a chlorine atmosphere while the catalyst is exposed to a gas of a hydrocarbon compound excluding $CH_4$ or an oxygen-containing carbon compound, thereby volatilizing the tungsten and the titanium from the DeNOx catalyst, and recovering the tungsten and the titanium from the DeNOx catalyst.

2. The method of separating and recovering metal elements according to claim 1, wherein the first heating step is performed at a first heating temperature, the second heating step is performed at a second heating temperature, and the second heating temperature is lower than the first heating temperature.

3. The method of separating and recovering metal elements according to claim 2, wherein mainly tungsten is volatilized and recovered from the DeNOx catalyst in the second heating step.

4. The method of separating and recovering metal elements according to claim 2, the method further comprising a recovery step of cooling a gas containing the volatilized tungsten and titanium in a stepwise manner, thereby separating and recovering the tungsten and the titanium.

5. The method of separating and recovering metal elements according to claim 1, wherein mainly tungsten is volatilized and recovered from the DeNOx catalyst in the second heating step.

6. The method of separating and recovering metal elements according to claim 1, the method further comprising a recovery step of cooling a gas containing the volatilized tungsten and titanium in a stepwise manner, thereby separating and recovering the tungsten and the titanium.

7. The method of separating and recovering metal elements according to claim 5, the method further comprising a recovery step of cooling a gas containing the volatilized tungsten and titanium in a stepwise manner, thereby separating and recovering the tungsten and the titanium.

\* \* \* \* \*